United States Patent [19]
Peters

[11] Patent Number: 5,173,629
[45] Date of Patent: Dec. 22, 1992

[54] ELECTRIC MOTOR STATOR ASSEMBLY WITH SQUARE EDGED STATOR PLATES

[75] Inventor: Richard E. Peters, Tipp City, Ohio

[73] Assignee: A. O. Smith Corporation, Milwaukee, Wis.

[21] Appl. No.: 435,568

[22] Filed: Nov. 13, 1989

[51] Int. Cl.$^5$ .................... H02K 1/06; H02K 1/20; H02K 1/12
[52] U.S. Cl. .................... 310/216; 310/58; 310/64; 310/254; 310/259
[58] Field of Search ............ 310/57, 58, 64, 216, 310/217, 218, 254, 258, 259

[56] References Cited

U.S. PATENT DOCUMENTS

| | | | |
|---|---|---|---|
| 1,159,121 | 11/1915 | Starker | 310/258 |
| 1,882,487 | 10/1932 | Dupont | 310/217 |
| 2,735,950 | 2/1956 | Brown | 310/57 |
| 4,912,350 | 3/1990 | Parshall et al. | 310/217 |

FOREIGN PATENT DOCUMENTS

| | | | |
|---|---|---|---|
| 195995 | 2/1958 | Austria | 310/258 |
| 512860 | 9/1939 | United Kingdom | 310/258 |

*Primary Examiner*—Steven L. Stephan
*Assistant Examiner*—C. LaBalle
*Attorney, Agent, or Firm*—Andrus, Sceales, Starke & Sawall

[57] ABSTRACT

A laminated stator assembly for an electric motor includes plate laminations which have square-trimmed edge segments separated by circular peripheral edge sectors, which plates are randomly oriented in assembling the stator to provide a generally cylindrical outer surface. In this manner, the stator can be enclosed in and supported by an outer motor shell or housing which is substantially thinner and less expensive. The stator assembly of the present invention enjoys the material savings and enhanced air cooling characteristics of prior art stator constructions utilizing square-trimmed laminations, but eliminates the detrimental aspects of difficult alignment and heavier motor housings. In addition, overall stator assembly is substantially simplified.

7 Claims, 2 Drawing Sheets

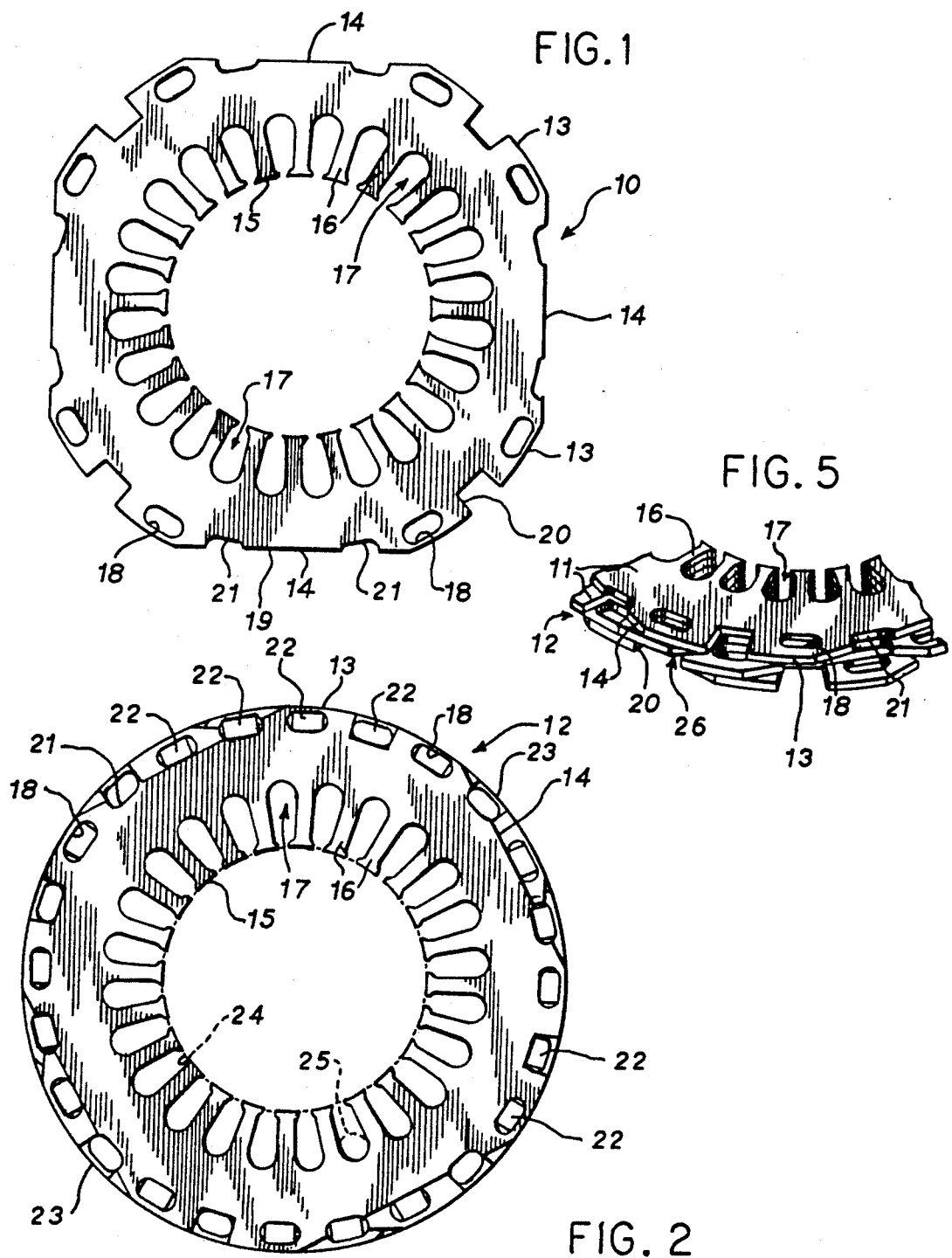

ELECTRIC MOTOR STATOR ASSEMBLY WITH SQUARE EDGED STATOR PLATES

BACKGROUND OF THE INVENTION

The present invention pertains to electric motors in which the stator element is formed from a laminated assembly of generally circular plates and, more particularly, to such an assembly in which the plate edges are partially truncated or squared and randomly oriented in a circumferential direction during assembly such that the effective outer surface of the plate stack is maintained cylindrical.

It is well known in the art to construct the stator element of an electric motor from a stack of thin plates in a laminated configuration. The plates have a circular center opening defined by radial stator legs which, in the assembled stack, define a circular inner opening for the rotor. The radial outer peripheral surface of the stack is typically enclosed in a motor housing or shell. When circular plates are utilized, the interior of the housing or shell is generally cylindrical in shape. It is also known to trim or square the edges of the plates to save material, but to leave circular peripheral edge sectors between the trimmed edges which sectors are aligned in assembly to provide semicylindrical surface portions supported directly by the cylindrical interior of the housing. The square trimmed edges are likewise aligned in the assembled stack to provide open outer cylindrical segments for the passage of cooling air between the plate assembly and the inside of the housing or shell. However, the lack of a fully continuous cylindrical outer surface in this plate assembly requires the use of a heavier outer housing or frame and also the possible need to machine or otherwise form tenons on the inside of the housing to achieve good concentricity in the assembled stator.

U.S. Pat. Nos. 1,156,639, 1,158,495 and 2,818,515 all disclose stator assemblies utilizing stacks of laminated plates having squared outer edges separated by circular peripheral edge sectors which circular edges bear against the cylindrical inner face of the motor housing. These patents also show the use of small thinner element substacks which are circumferentially indexed to offset the circular edge portions and provide more continuous support for the cylindrical inside surface of the frame. Although such constructions provide somewhat increased internal support, alignment of the plates in each substack and careful indexing of adjacent substacks making up the entire stator assembly require the use of more sophisticated assembling techniques and equipment.

It is also known to form laminated rotor assemblies for electric motors with circular rotor plates which are randomly oriented to eliminate a buildup of edge thickness variations in the plates over the full width of the plate stack. As indicated, however, rotor plates, unlike stator plates, have completely circular outer peripheral edges and randomizing is easily accomplished utilizing any one of several known techniques.

SUMMARY OF THE INVENTION

In accordance with the present invention, a laminated stator assembly for an electric motor includes a series of stator plates which are disposed in face-to-face relation to provide a laminated stator stack. Each of the stator plates is identically formed with generally circular peripheral edge sectors which are separated by square-trimmed edge segments. In assembling the stack, the plates are disposed in a random circumferential orientation such that the circular peripheral edge sectors provide a stack having a generally cylindrical outer surface. The generally cylindrical outer surface of the plate stack allows the use of thinner and less expensive outer housings and the random orientation of the plates requires less sophisticated equipment and assembly techniques.

The circular edge sectors of the plates are provided with circumferentially spaced edge openings which are radially aligned with stator legs defining an inner diameter and circular opening in the plate. Alignment of the stator slots between the legs in assembly results in direct alignment of the edge openings in the plates, such that the assembled stack is also provided with a series of circumferentially spaced, axial through holes for the flow of cooling air.

The square-trimmed edge segments on each plate are defined by opposite pairs of parallel chords which lie generally radially inwardly of the edge openings in the circular edge sectors.

The method of assembling the plate stack of the present invention comprises the steps of aligning the plates on the common axis of the circle defined by the peripheral edge sectors, and orienting the plates randomly in a circumferential direction on that axis to provide a stack that has a generally cylindrical outer surface. Each of the plates has an open circular interior which is concentric with the circle defined by the circular edge sectors, and the alignment step comprises aligning on the edges of the open circular interiors of the plates. The stator slots defined by each adjacent pair of stator legs provide the circumferential alignment necessary to align the spaced edge openings in the plates to maintain the through air passages in the laminated stack. Some of the through passages are also utilized to accommodate mounting bolts. Certain plate edge openings may extend to the surface of the stack to provide radial vent slots.

BRIEF DESCRIPTION OF THE DRAWINGS

FIG. 1 is a plan view of a stator plate comprising one lamination of the stator assembly of the present invention.

FIG. 2 is a plan view of a stack of randomly oriented plates of the type shown in FIG. 1.

FIG. 5 is a detail of a portion of the assembled laminated stack for the stator.

DETAILED DESCRIPTION OF THE PREFERRED EMBODIMENT

Figure 4:
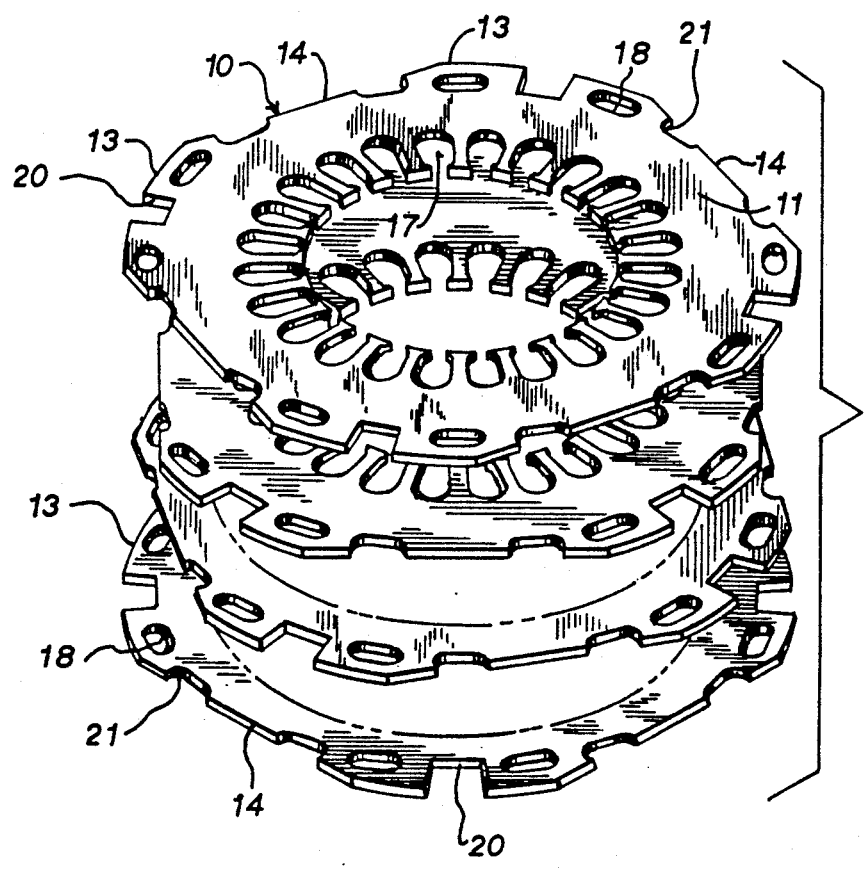
FIG. 4 is an exploded perspective view of a laminated stator assembly of the present invention.

In FIG. 1, there is shown a stator plate 10 typically formed from a thin ferrous metal sheet, as by stamping. The plate 10 may have a thickness, for example, of 0.026 inch. Each of the plates 10 provides a single lamination 11 for a stack 12 comprising a laminated stator assembly, as shown in FIGS. 2 and 4. The laminated assembly may include 50 plates or more.

Each of the plates 10 is of a generally circular configuration and includes circular peripheral edge sectors 13 which are separated by square-trimmed edge segments 14. Each of the plates 10 includes a circular interior opening 15 which is defined by a series of inwardly extending radial stator legs 16. Each pair of legs 16 defines a stator slot 17 which, in the assembled stack 12, provides slots for the windings of the motor. The circular interior opening 15, in the assembled stack, provides an opening for the rotor.

The edge segments 14 are trimmed generally along parallel opposite chords of the circle defined by the circular edge sectors 13. Each of the circular edge sectors 13 includes a pair of circumferentially spaced oblong holes 18 separated by a square notch 20. The adjacent square-trimmed edge segments include a pair of oblong notch portions 21 spaced from one another by the same distance as the spacing of the oblong holes 18, each of which notch portions 21 is spaced from its adjacent oblong hole 18 by one-half that distance. The center of chord 19 defining the edge segment 14 is approximately the same radial distance from the center of the plate 10 as the bottom of the square notch 20 in the circular edge sector 13.

Each oblong hole 18, square notch 20, and oblong notch portion 21 has a common pitch diameter and is centered on a radial line through a stator leg 16 (bisecting each adjacent pair of stator slots 17). In accordance with the dimensional relationship just described, it will be seen that the angular distance between each adjacent pair comprising either an oblong hole 18 and square notch 20 or an oblong hole 18 and oblong notch portion 21 is identical to the angular spacing between adjacent stator slots 17. Thus, if a pair of adjacent axially aligned plates 10 is indexed circumferentially one with respect to the other by an amount equal to the angular distance therebetween or between a pair of adjacent stator slots 17 (or some multiple thereof), there will always be mutual open alignment in an axial direction through any resulting overlapping combination of holes 18, notches 20 and notch portions 21. Therefore, referring particularly to FIG. 2, assembly of a stack 12 of plate laminations 11 to provide the necessary stator slots 17 will result in a series of peripheral, circumferentially spaced vent holes 22 through the stack 12.

More importantly, however, if in the alignment of the plates to provide the required stator slots 17, the plates 10 are randomly oriented in a circumferential direction, the laminated stack will have a generally cylindrical outer surface 23, as shown in FIG. 2. Surface 23 provides a generally continuous outer surface for contact with the cylindrical interior surface of the motor housing or shell within which the stator is disposed. The problems of concentricity and/or housing strength common in square-trimmed plates of the prior art are substantially eliminated. In addition, random orientation in the manner previously described is substantially easier to obtain in an actual assembly environment.

In accordance with the method of the present invention, the plates are aligned on the common axis of the circular interior openings 15 and located angularly on the stator slots 17. Random angular plate orientation with location on the slots 17 results in a stack having the generally cylindrical outer surface 23 described above and correspondingly maintains axial alignment through the stack of any overlapping holes 18, notches 20 and notch portions 21 to maintain open vent holes 22 through the stack 12.

In accordance with one assembly method, a stack of plates 10 is aligned on a cylindrical mandrel 24 having a diameter approximately equal to the diameter of the circular interior opening 15 in the plates, the plates are randomly spun with respect to one another as they are dropped or otherwise moved axially along the mandrel onto a radially offset and axially extending locating pin 25 which extends into and precisely locates one of the stator slots 17. Known vibratory assembling techniques may also be employed in assembling the laminated stack 12.

Referring also to FIG. 5, the square notches 20 in the circular edge sectors 13 of the plates also serve to provide an additional radial vent slot 26 in the assembled stack to provide additional air circulation for cooling. Similar radial venting is, of course, provided by the oblong notch portions 21 and the flat cord portions 19 therebetween. Thus, if a square notch 20 were sandwiched between and aligned directly with an oblong hole 18 in a plate on either side thereof, an axially thin and circumferentially short vent slot 26 would be defined.

Figure 3:
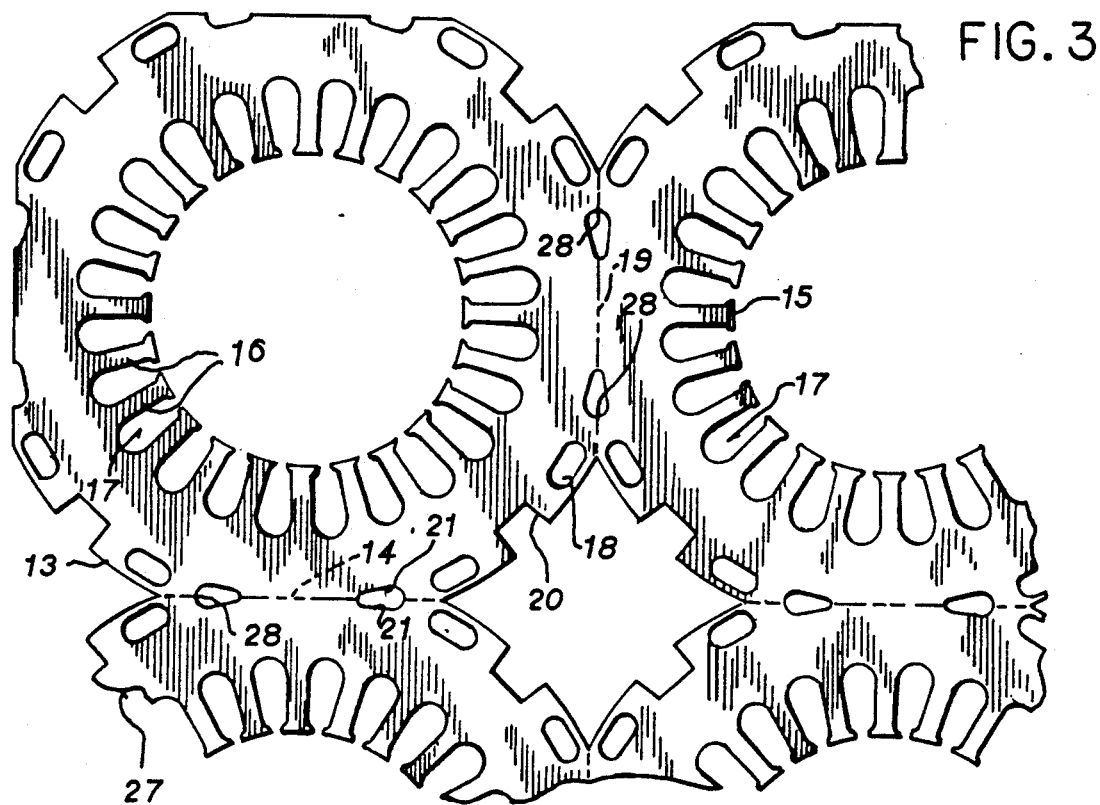
FIG. 3 shows the planar orientation of a number of stator plates as the edges are square-trimmed.

In FIG. 3, when a number of plates 10 are formed in a single thin metal sheet 27, the plates may be oriented, stamped and trimmed to provide a minimum of scrap. In one preferred orientation, the chord lines 19 defining square trimmed edge segments 14 of adjacent plates 10 coincide directly. However, to provide the oblong notch portions 21 which are properly oriented on pitch diameter of the oblong holes 18, tear drop shaped holes 28 are punched in the sheet 27 on the chord line 19 defining the subsequently formed square-trimmed edge segment 14.

In accordance with the present invention, a laminated stator assembly is provided which attains the advantages of an essentially fully cylindrical outer surface, but has the benefits of material saving, air cooling and heat transfer of plates with square-trimmed edges. In addition, the ability to randomly orient the plates in a circumferential direction simplifies assembly. It is also believed that random orientation of the square-trimmed edges results in improved magnetic performance in the stator because peak magnetic densities which occur in prior art constructions where the trimmed edges are aligned to form flats are reduced. As previously indicated, the substantially cylindrical outer surface provided by random plate orientation allows the use of a thinner cylindrical outer housing with corresponding cost savings.

Various modes of carrying out the present invention are contemplated as being within the scope of the following claims particularly pointing out and distinctly claiming the subject matter which is regarded as the invention.

I claim:

1. A laminated stator assembly for an electric motor comprising:
    a series of stator plates disposed in stacked face-to-face relation;
    each of said plates formed with generally circular peripheral edge sectors separated by square trimmed edge segments;
    each plate further including a circular interior opening defined by circumferentially spaced inwardly extending radial stator legs;
    said stacked plates having complete circumferential register and axial aligment of the stator legs; and
    the circular peripheral edge sectors of said plates disposed in random circumferential orientation to provide a laminated stack having a generally cylindrical outer surface.

2. The assembly as set forth in claim 1 including edge openings in said circular edge sectors of each plate adapted to cooperate with edge openings and trimmed edge segments in other plates comprising the laminated stock to provide axially disposed peripheral vent holes through said stack.

3. The assembly as set forth in claim 2 wherein the circular edge sectors of each plate include a series of circumferentially spaced edge openings.

4. The assembly as set forth in claim 3 wherein each plate comprises four circular edge sectors separated by opposite pairs of parallel chords defining said square trimmed edge segments.

5. The assembly as set forth in claim 4 wherein said edge openings are aligned radially with inwardly adjacent stator legs.

6. The assembly as set forth in claim 5 wherein said stator legs of adjacent stack plates are aligned to define therebetween continuous stator slots extending through the plate stack.

7. The assembly as set forth in claim 6 wherein the edge segments defined by said chords lie generally radially inwardly of said edge openings.

* * * * *